United States Patent
Colburn

[15] 3,644,951
[45] Feb. 29, 1972

[54] COMBINATION TRUCK WHEEL UNLATCHING HOOK AND PETCOCK RELEASE DEVICE

[72] Inventor: Donald A. Colburn, 13 State St., Manchester, N.Y. 14504

[22] Filed: Feb. 26, 1970

[21] Appl. No.: 885,625

[52] U.S. Cl. .................................7/1 G, 81/177 A, 294/24
[51] Int. Cl. .........................................................B25f 1/04
[58] Field of Search..................7/1 G, 1 R; 81/177 A, 3; 294/24, 19, 26; 16/115, 124; 287/58, 58 CT

[56] References Cited
UNITED STATES PATENTS 1,437,211  11/1922  Yocom .....................................7/1 G
1,768,425  6/1930  Smith ......................................16/115
2,161,512  6/1939  Haislip ................................294/26 X

*Primary Examiner*—Theron E. Condon
*Assistant Examiner*—Roscoe V. Parker, Jr.

[57] ABSTRACT

An extension rod device for unlatching and pulling the lever on a trailer truck's fifth wheel without getting the user's clothes dirty. This device also includes a slotted end for engaging the air tank petcock in order to release therefrom.

2 Claims, 6 Drawing Figures

Patented Feb. 29, 1972

INVENTOR.
DONALD A. COLBURN

Patented Feb. 29, 1972
3,644,951
2 Sheets-Sheet 2
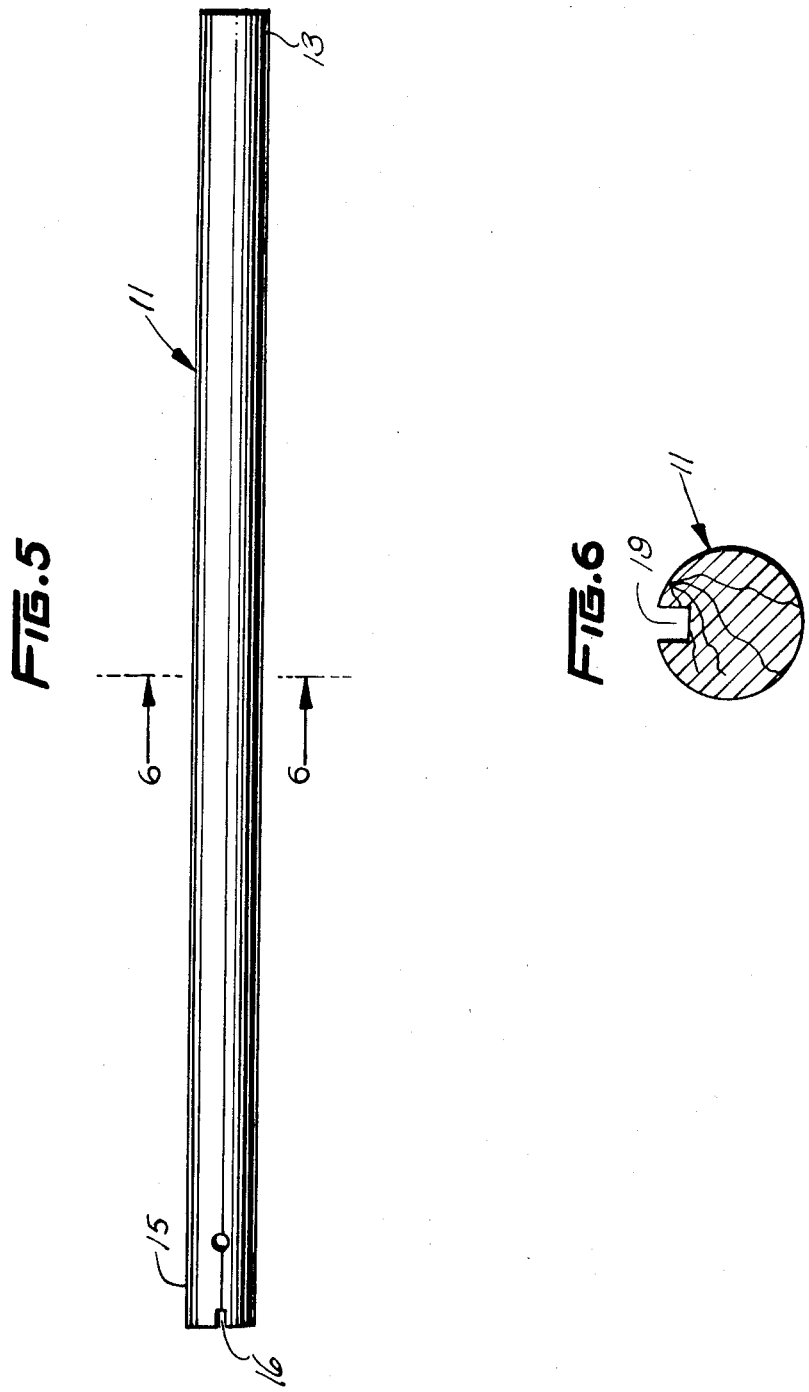
INVENTOR.
DONALD A. COLBURN

COMBINATION TRUCK WHEEL UNLATCHING HOOK AND PETCOCK RELEASE DEVICE

This invention relates to collapsible extension devices, and more particularly to a combination truck wheel unlatching hook and petcock release device for trailer trucks.

It is therefore the main purpose of this invention to provide a combination device which serves as an extension to pull the lever on a trailer truck fifth wheel and also to engage the petcock drain on the air tank of the vehicle.

Another object of this invention is to provide a device of the described type which will have a portion carried by an elongated wooden rod that will extend in order to reach the lever on the truck's fifth wheel in order to unlatch it, thus preventing the operator from getting their clothes soiled.

Other objects of the present invention are to provide a combination truck wheel unlatching hook and petcock release device which is simple in design, inexpensive to manufacture, rugged in construction, easy to use and efficient in operation.

These and other objects will be readily evident upon a study of the following specification and the accompanying drawings wherein:

FIG. 5 is a horizontal and elevated view of the handle of the device with other components removed therefrom; and FIG. 6 is an enlarged transverse view taken along the line 6—6 of FIG. 5.

Figure 1:
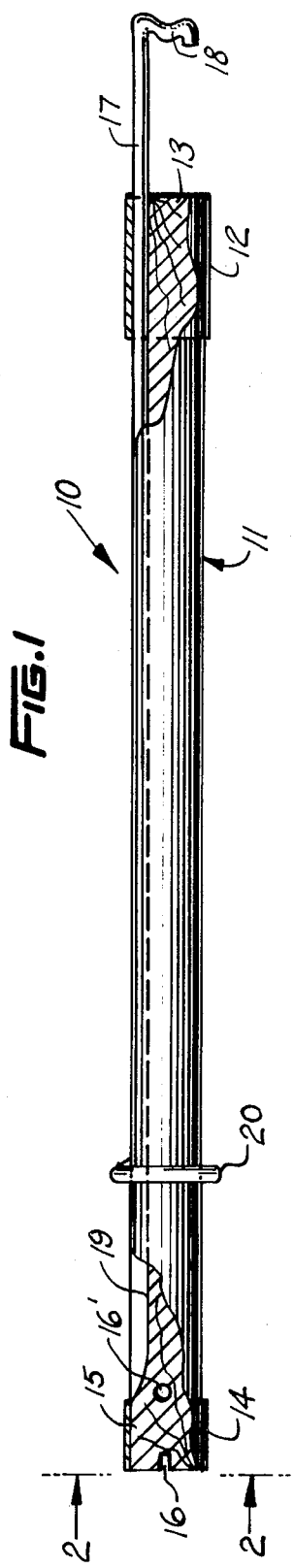
FIG. 1 is a horizontal view of the present invention shown in elevation and partly broken away.
Figure 3:
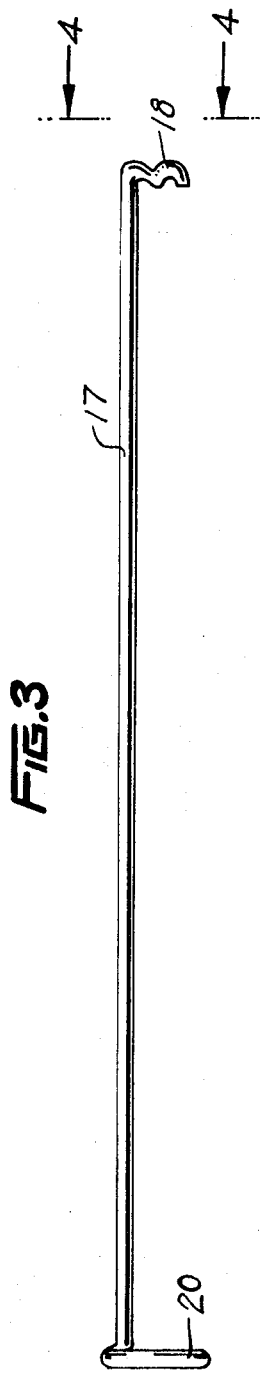
FIG. 3 is a horizontal and elevated view of the rod portion of the device shown removed from FIG. 1.
Figure 4:
FIG. 4 is a view taken along the lines 4—4 of FIG. 3.
Figure 2:
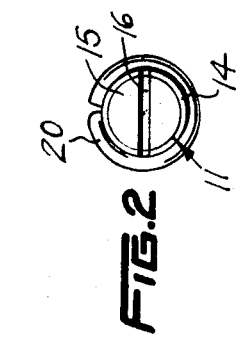
FIG. 2 is a view taken along the lines 2—2 of FIG. 1.

According to this invention, a combination truck wheel unlatching hook and petcock release device 10 is shown to include an elongated wooden handle 11 having a metalic sleeve 12 secured fixedly to end 13. Sleeve 14 of suitable metalic material, is secured fixedly to end 15 of handle 11 and a transverse slot 16 across end 15 serves as engagement means for the air tank petcock of the vehicle.

An opening 16' transversely through end 15 of handle 11 provides a means for receiving a pin (not shown) in the event that sleeve 14 is removed.

Handle 11 carries an elongated rod 17 having a hook 18 for unlatching and pulling the lever on truck fifth wheel (not shown). Rod 17 is slidable within an elongated slot 19 of handle 11 and rod 17 is also provided with a ring portion 20 which encircles the outer periphery of handle 11 and also serves as stop limit means against sleeve 12 when rod 17 is extended completely.

In use, device 10 is handheld by means of its handle 11 and rod 17 may be extended to its entire length wherein the ring portion 20 will abutt with sleeve 12 fixedly secured to end 13 of handle 11 in order to unlatch and pull the lever on the truck's fifth wheel without the user's clothes becoming soiled.

When device 10 is reversed, the end 15 with its slot 16 may engage the petcock of the air tank in order to bleed the air therefrom.

I claim:

1. A combination device for unlatching a trailer truck's fifth wheel and bleeding air from the tank of said vehicle, comprising an elongated handle portion, an elongated rod having a hooked end carried by said handle portion providing extension means for said device for engaging and unlatching the fifth wheel of said vehicle, said rod being formed with a ring portion at the other end for mounting said rod on said handle portion, said handle portion being formed with an elongated slot parallel with the longitudinal axis thereof and providing guide means for said rod received within said slot, sleeve means secured fixedly to one end of the handle portion providing guide means and stop means for said rod whereby said ring portion abutts said sleeve when said rod is extended to its full length, and means carried by the other end of said handle portion for engaging the petcock of the air tank in order to bleed it.

2. The combination according to claim 1, wherein the means on the other end of the handle portion comprises a diametrical slot for engaging the petcock and a sleeve surrounding the handle portion other end for providing rigidity to the same.

* * * * *